Patented Feb. 12, 1952

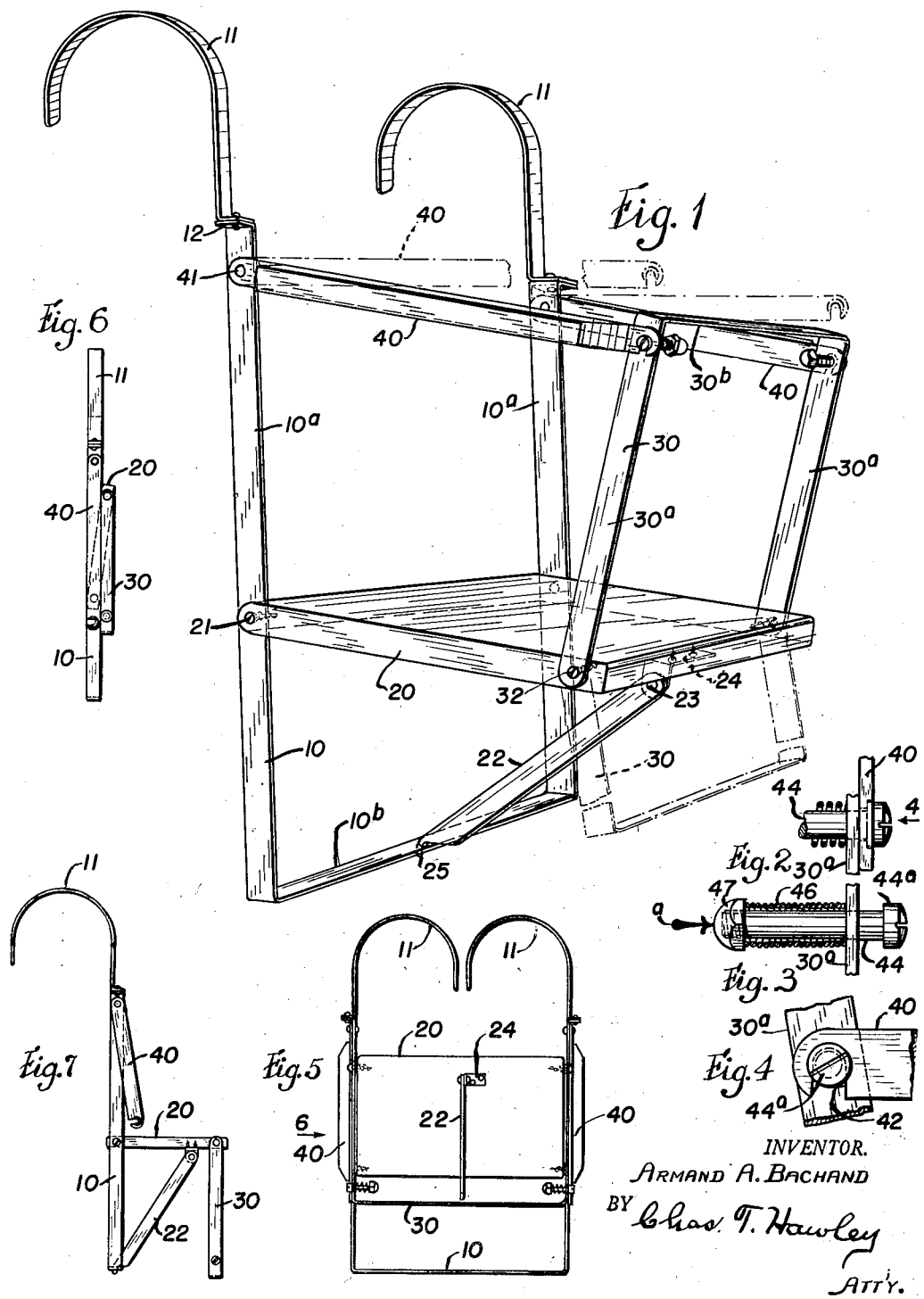

2,585,721

UNITED STATES PATENT OFFICE 2,585,721

AUXILIARY AUTOMOBILE SEAT FOR CHILDREN

Armand A. Bachand, Worcester, Mass.

Application January 21, 1950, Serial No. 139,900

5 Claims. (Cl. 155—11)

This invention relates to an auxiliary automobile seat for use by a small child. Such seats are designed for removable attachment to the back of one of the regular seats in an automobile, and commonly embody provision for holding the child in the seat.

It is the general object of my present invention to provide an auxiliary seat having holding means which may be swung forward and downward to admit a child, and which may be firmly held in raised position to retain the child in place.

My invention further relates to arrangements and combinations of parts which will be hereinafter described and more particularly pointed out in the appended claims.

A preferred form of the invention is shown in the drawings, in which

Fig. 1 is a perspective view of my improved auxiliary seat;

Fig. 2 is a partial front view of a fastening device;

Fig. 3 is a view similar to Fig. 2 but with the parts in releasing position;

Fig. 4 is a partial side elevation, looking in the direction of the arrow 4 in Fig. 2;

Fig. 5 is a front elevation of the auxiliary seat in folded position;

Fig. 6 is a side view of the folded seat, looking in the direction of the arrow 6 in Fig. 5; and Fig. 7 is a side elevation showing the holding member swung downward to facilitate the placing of a child in the seat.

Referring to the drawings, my improved seat comprises a U-shaped sheet metal frame 10 having hooks 11 swiveled to the offset upper ends 12 of the upright side portions 10a of the frame. The hooks 11, when in the position shown in Figs. 1 and 7, are adapted to hook over the back of an automobile seat of any usual construction. When the seat is to be folded, the hooks 11 may be swung toward each other to the positions shown in Figs. 5 and 6.

A seat 20 is pivoted at 21 to the side portions 10a of the frame 10, and the seat 20 is provided with a brace 22 pivoted at 23 to a bracket 24 secured to the front edge of the seat. The lower end of the brace 22 terminates in a lug 25 adapted to be inserted in a hole in a bottom portion 10b of the frame 10 and to thereby hold the seat 20 firmly in raised position.

A U-shaped holding member 30 comprises side portions 30a and an upper cross-piece 30b. The lower ends of the side portions 30a are pivoted at 32 to the front portion of the seat 20. The holding member 30 may be swung about the pivots 32 from the raised or holding position shown in full lines in Fig. 1 to the lowered position shown in Fig. 7 and in broken lines in Fig. 1.

Side arms 40 are pivoted at 41 to the upper parts of the side portions 10a of the frame 10, and these arms 40 have notches 42 (Fig. 4) at their front ends. Studs 44 are slidably mounted near the upper ends of the side portions 30a of the holding member 30 and are secured in holding position by coil springs 46 retained by nuts 47. The notches 42 are counterbored at their upper ends to receive the heads 44a of the studs 44.

When the studs 44 are seated as shown in Figs. 2 and 4, the side arms 40 and the holding member 30 are firmly secured in the positions shown in full lines in Fig. 1, and the child is securely held from escape or accidental displacement.

When the springs 46 are compressed as indicated by the arrow $a$ in Fig. 3, the side arms 40 may be raised as indicated in broken lines in Fig. 1, and the holding member 30 may be swung downward to release a child or to permit convenient placing of a child on the seat. During this procedure, the side arms 40 may be dropped to the position shown in Fig. 7.

When the auxiliary seat is to be folded, the hooks 11 are swung toward each other into the plane of the frame 10, the seat 20 is raised, and the arms 40, holding member 30 and brace 22 are swung downward, all as shown in Figs. 5 and 6. A flat and very compact package is thus produced, which may be easily stored or transported.

The provision of the freely-swinging holding member 30 in my improved seat greatly facilitates the placing of a child in the seat or the removal of a child therefrom, as it is not necessary to insert the child from above nor to remove the child upward, as has been previously customary.

Having thus described my invention and the advantages thereof, I do not wish to be limited to the details herein disclosed, otherwise than as set forth in the claims, but what I claim is:

1. An auxiliary automobile seat comprising a frame, means to secure said frame to the back of a regular automobile seat, a seat member mounted on said frame, a rigid child-retaining member effective to retain a child on said seat member, said child-retaining member being pivoted to the child-supporting seat member and adjacent the front edge portion thereof and being movable to and from child-retaining position, and means to secure said member in child-retaining position.

2. An auxiliary automobile seat comprising a frame, means to secure said frame to the back of a regular automobile seat, a seat member mounted on said frame, a child-retaining member effective to retain a child on said seat member, said child-retaining member being U-shaped and pivoted to said seat member and being swingable to raised and lowered positions, and means to secure said member in raised and child-retaining position.

3. An auxiliary automobile seat comprising a frame, means to secure said frame to the back of a regular automobile seat, a seat member mounted on said frame, a child-retaining member effective to retain a child on said seat member, said child-retaining member being pivoted to said seat member and being swingable from a raised and child-retaining position in front of the child to a lowered position at the feet of the child, and means to secure said child-retaining member in raised position.

4. An auxiliary automobile seat comprising a frame, means to secure said frame to the back of a regular automobile seat, a seat member mounted on said frame, a child-retaining member effective to retain a child on said seat member, said child-retaining member being U-shaped and pivoted to said seat member and being swingable to raised and lowered positions, arms pivoted to said frame, and means to detachably secure said arms to said member when the latter is in raised and child-retaining position.

5. The combination in an auxiliary automobile seat as set forth in claim 4, in which the arms are transversely slotted and recessed adjacent their free front ends, and in which the detachable securing means comprises spring-pressed headed studs normally seated in said recessed transverse slots.

ARMAND A. BACHAND.

REFERENCES CITED

The following references are of record in the file of this patent:

UNITED STATES PATENTS

| Number | Name | Date |
|--------|------|------|
| 1,397,281 | Haas | Nov. 15, 1921 |
| 2,508,822 | Goldberg | May 23, 1950 |
| 2,529,532 | Abbott | Nov. 14, 1950 |